(12) United States Patent  
Roberts

(10) Patent No.: US 7,743,081 B2  
(45) Date of Patent: Jun. 22, 2010

(54) FAST LOCAL RECOMMENDER QUERIES VIA MODIFIED SPATIAL DATA STRUCTURE QUERYING

(75) Inventor: Michael Roberts, Woodside, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 329 days.

(21) Appl. No.: 11/857,270

(22) Filed: Sep. 18, 2007

(65) Prior Publication Data

US 2009/0077058 A1    Mar. 19, 2009

(51) Int. Cl.  
*G06F 17/30* (2006.01)

(52) U.S. Cl. .................................... 707/821

(58) Field of Classification Search ............. 707/1, 707/2, 100, 200  
See application file for complete search history.

(56) References Cited

U.S. PATENT DOCUMENTS

| | | |
|---|---|---|
| 6,643,645 B1 | 11/2003 | Fayyad et al. |
| 6,700,574 B1 | 3/2004 | Song |
| 6,879,980 B1 | 4/2005 | Kothuri |
| 7,085,818 B2 | 8/2006 | Brown |
| 7,213,048 B1 | 5/2007 | Parupudi |
| 2003/0135582 A1 | 7/2003 | Allen |

OTHER PUBLICATIONS

Schlich et al., Structure of Leisure Travel: Temporal and Spatial Variability, Mar. 2004, transport Review, vol. 24, No. 2 pp. 219-237.*

Hung-Wen Tung and Von-Wun Soo, A Personalized Restaurant Recommender Agent for Mobile E-Service, Proc. of the 2004 IEEE International Conference on e-Technology, e-Commerce and e-Service (EEE'04).

Daniel Ashbrook and Thad Starner, Using GPS to Learn Significant Locations and Predict Movement Across Multiple Users, In Personal and Ubiquitous Computing, vol. 7, No. 5, Oct. 2003, pp. 275-286.

Max J. Egenhofer, What's Special about Spatial? Database Requirements for Vehicle Navigation in Geographic Space, ACM, 1993.

Tewari, Gaurav et al., "Personalized Location-based Brokering Using an Agent-Based Intermediary Architecture", Proceedings of the International Conference on E-Commerce, Seoul, Korea 2002, XP-002509622.

* cited by examiner

*Primary Examiner*—Fred I Ehichioya  
(74) *Attorney, Agent, or Firm*—Park, Vaughan & Fleming LLP

(57) ABSTRACT

One embodiment of the present invention provides a system that can recommend leisure activities to a user. During operation, the system receives one or more activity types. Next it receives a bound in terms of a nearness metric such as travel distance, travel time, or travel cost. Next, it receives location information associated with a computing device of the user. The system then uses the location information to identify a cell stored in a spatial database. The system then returns a set of leisure activities that match the activity types and that are within the bound relative to the cell. The spatial database includes leisure activity data that is segmented based on physical position such as latitude and longitude. Moreover, the cells of the spatial database are linked based on the nearness metric.

17 Claims, 11 Drawing Sheets

400
CELL IN SPATIAL
DATABASE WITH
ABSTRACT ACTIVITY
TYPE "DO"

410
CELL IN SPATIAL
DATABASE WITH
ABSTRACT ACTIVITY
TYPE "EAT"

500 — CELL LINKS BASED ON NEARNESS METRIC (TRAVEL DISTANCE)

510 — CELL LINKS BASED ON NEARNESS METRIC (TRAVEL TIME)

520 — CELL LINKS BASED ON NEARNESS METRIC (TRAVEL COST)

FAST LOCAL RECOMMENDER QUERIES VIA MODIFIED SPATIAL DATA STRUCTURE QUERYING

BACKGROUND

1. Field of the Invention

The present invention relates to recommender systems that provide users with recommendations for products, services, or location, which meet their stated or inferred preferences. More specifically, the present invention relates to a method and an apparatus that facilitates making recommendations for leisure activities based on both locality and utility to the user using a spatial database.

2. Related Art

Recommender systems are often used in conjunction with online retail sales to make recommendation based on user preferences. For example, if a user has a preference for science fiction books, such a system might recommend all new books associated with the term "science fiction." With the recent advent of location-aware and mobile computing systems it is desirable to incorporate spatial data as part of the recommendation. As there might be millions of potentially recommendable items and a large number of concurrent users, it is desirable that such a system is scalable and sufficiently fast for real-time use.

SUMMARY

One embodiment of the present invention provides a system that can recommend leisure activities to a user. During operation, the system receives one or more activity types. Next it receives a bound in terms of a nearness metric such as travel distance, travel time, or travel cost. Next, it receives location information associated with a computing device of the user. The system then uses the location information to identify a cell stored in a spatial database. The system then returns a set of leisure activities that match the activity types and that are within the bound relative to the cell. The spatial database includes leisure activity data that is segmented based on physical position such as latitude and longitude. Moreover, the cells of the spatial database are linked based on the nearness metric In a variation of this embodiment, each activity type is associated with an abstract activity type such as "DO," "EAT," "BUY," "READ," and "SEE."

In a further variation of this embodiment, the spatial database comprises multiple spatial databases, each of which comprises a single abstract activity type such as "DO," "EAT," "BUY," "READ," or "SEE."

In a further variation of this embodiment, the nearness metric is based on one or more of: travel distance, travel time, and travel cost.

In a further variation, receiving location information involves receiving a set of coordinates associated with the computing device of the user.

In a further variation, using the location information to identify a cell stored in the spatial database further comprises computing the difference in latitude from the location of the computing device to an origin specified in the spatial database and computing the difference in longitude from the location of the computing device to the origin specified in the spatial database. Next, this variation involves dividing the change in latitude by horizontal cell size to yield the horizontal index of the cell and dividing the change in longitude by vertical cell size to yield the vertical index of the cell. Finally, this variation involves returning the horizontal and vertical indices of the cell.

In a further variation, the number of cells in the spatial database depends on the density of leisure activities in a given geographic area and the type of leisure activity.

In a further variation, retrieving the set of leisure activities from the spatial database that are near the cell in the spatial database, further comprises locating a set of cells in the spatial database that are within a fixed neighborhood of the cell based on the cell links and returning the set of leisure activities associated with each of the cells in said set of cells.

In a variation of this embodiment, retrieving the set of leisure activities from the spatial database that are near the cell in the spatial database involves transitively searching through the linked cells according to the nearness metric.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer readable media now known or later developed.

Overview

Embodiments of the present invention provide a system that can recommend leisure activities to a user based on both proximity to the user and desired activity type. Particularly, this system can provide a mobile user with recommendations as they move. In addition, the recommendations can incorporate real-time data such as traffic, subway conditions, or other nearby users who are associated with the user.

Particularly, the present inventive recommendation system is location-aware and provides recommendations of leisure activities based on different factors such as nearness metric, bound, and activity types. This location-aware recommendation system differs from a standard recommendation system (such as used in online retail stores) in that it takes into account proximity of the activity to the user.

Embodiments of the present invention include a spatial database where leisure activities are stored in a format that reflects geographic cells based on their physical position. This particular type of spatial data structure enables scalability and sufficiently fast real time response in light of a large number of concurrent users and recommendable leisure activities.

Different embodiments of the present invention can be implemented on a user's mobile computing device. Particularly, the mobile computing device might include GPS (Geographic Positioning System or Global Positioning System) service which can provide the user's coordinates. The recommendation system can then use the user's coordinates to search matching leisure activity in the user's vicinity.

Recommendation Manager

Figure 1:
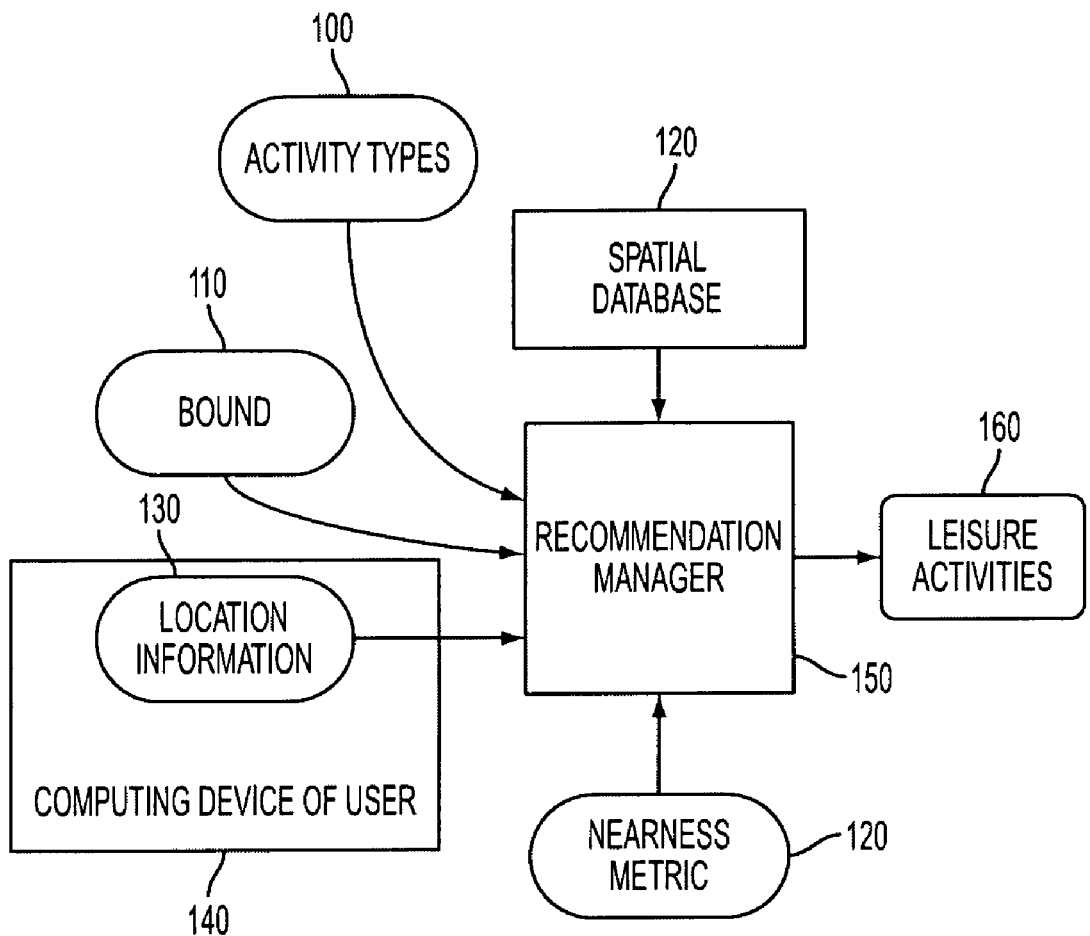
FIG. 1 presents an exemplary recommendation manager in accordance with an embodiment of the present invention.

FIG. 1 presents an exemplary recommendation manager 150 in accordance with an embodiment of the present invention. The recommendation manager receives activity types 100, a bound 110, a nearness metric 120, and location information 130 associated with a computing device of the user 140. The recommendation manager 150 identifies a cell stored in a spatial database 120 associated with the abstract activity type of the activity types 100, where leisure activity data is segmented based on physical position and where cells are logically linked based on the nearness metric 120. Next, the recommendation manager 150 retrieves from the spatial database 120 a set of leisure activities that matches the activity types 100 and that are within the bound 110 relative to the cell. Subsequently, the recommendation manager 150 returns the retrieved leisure activities.

Activity types 100 include leisure activities such as restaurants, bookstores, movie theaters, sports, sightseeing locations, and shopping for specific clothing items or retail goods. Each activity type is associated with an abstract activity type such as "EAT," "DO," "BUY," "READ," or "SEE." One skilled in the art will appreciate that an activity type can be anything in which the user can engage at a particular physical location.

The bound 110 can be based on one or more of travel time, travel distance, and travel cost. One skilled in the art will appreciate that the bound can also be based on any custom measures that are relevant to the user. For example, the user might base the bound on fuel usage. Such custom measures allow a user to define, store, and re-use custom measure in a flexible way.

Figure 2:
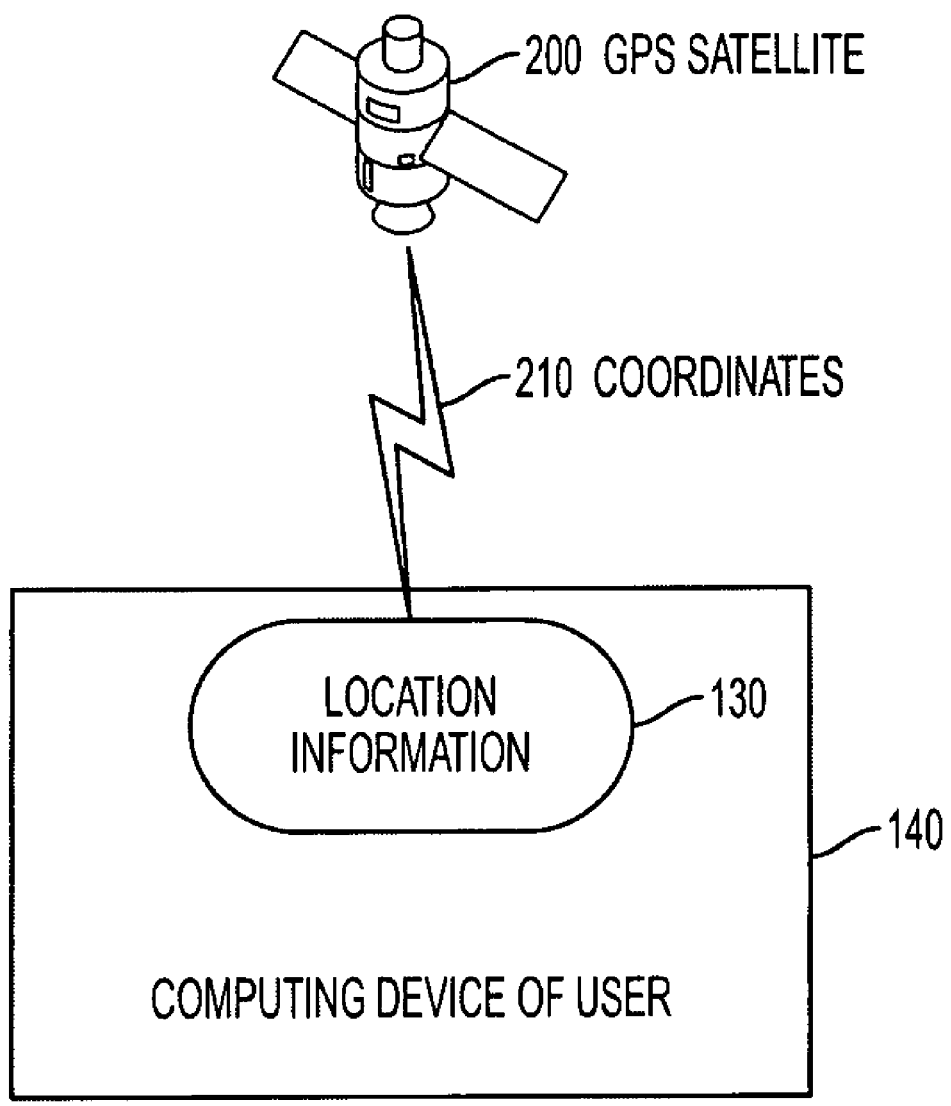
FIG. 2 presents an exemplary process of receiving location information in the form of coordinates from a GPS satellite in accordance with an embodiment of the present invention.

The location information 130 associated with a computing device of the user 140 identifies the current or future location of the user. For example, FIG. 2 shows that the location information is received from a GPS (Geographic Positioning System or Global Positioning System) comprising one or more satellites. In this situation, the location information is in the form of coordinates using a system such as latitude and longitude. One having ordinary skill in the art will appreciate that the location can also be received from other positioning devices such as within a context such as a large store or retail shopping center. In this situation, the coordinates are relative to the store or shopping center and the user desires recommendations within that store or shopping center, again based on physical proximity and activity types.

Location information 130 might also be based on partial, approximate, or inferred location such as in an automobile that cannot directly access an external positioning system because of obstructions or positioning system failure. For example, the distance and direction traveled in an automobile since the last position could be used to approximate the current position.

Location information 130 might also arrive from a source providing a future or intended location of the user. For example, the user might desire to find all parking lots near a location where the user intends to be in one hour. In this situation, the location information specifies the future or intended location of the user. One skilled in the art will appreciate that this location information can comprise any position that the user deems as important for the purpose of obtaining leisure activities.

Location information 130 might also be retrieved from locations that are stored in a computing device or other memory-based devices. This facilitates easy retrieval of frequently re-used locations.

Spatial Database

Figure 3:
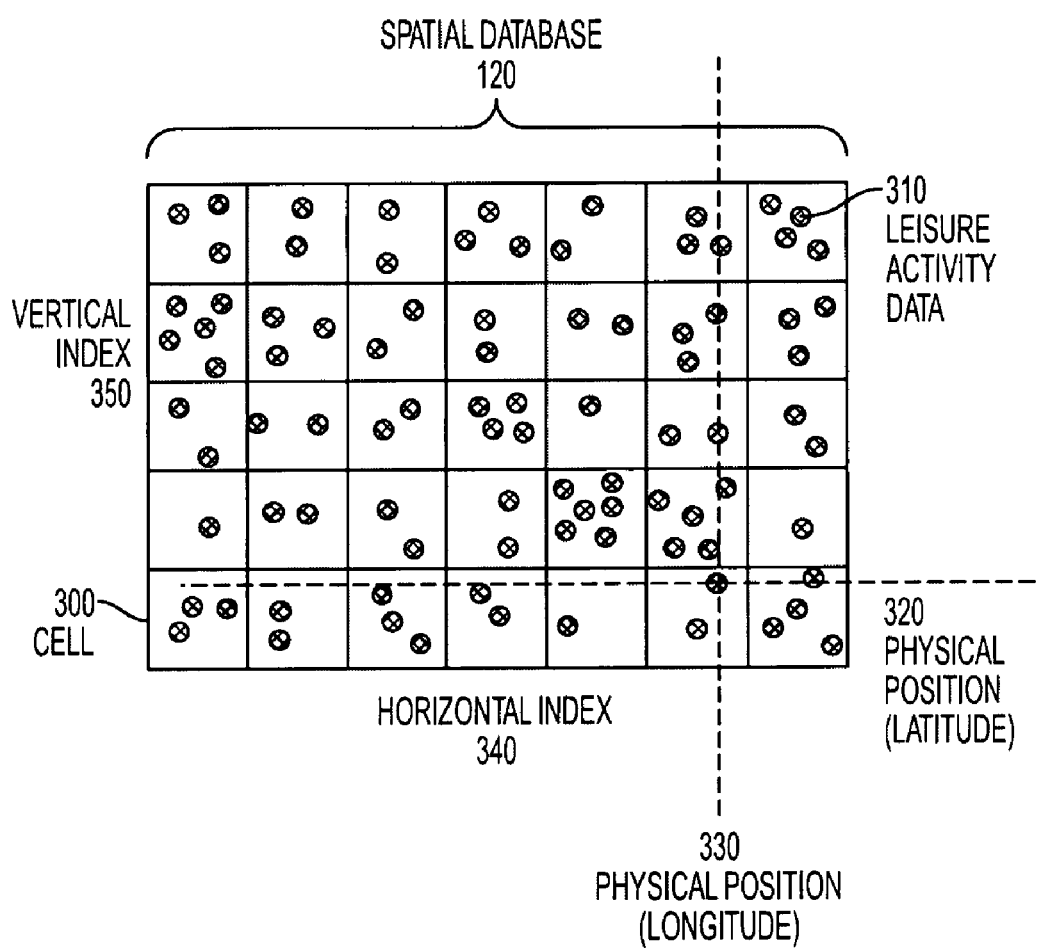
FIG. 3 presents an exemplary spatial database in accordance with an embodiment of the present invention.

FIG. 3 presents an exemplary spatial database 120 in accordance with an embodiment of the present invention. A spatial database 120 is a spatial data structure where cells (see cell 300) contain leisure activity data 310 of the same abstract activity type. For example, one spatial database might contain only activities of the abstract activity type "DO" while another might contain only activities of the abstract activity type "EAT."

Each leisure activity is associated with a particular position. In one embodiment, a position is defined in terms of latitude and longitude. FIG. 3 presents exemplary physical positions 320 and 330, based on latitude and longitude, respectively. An important aspect of the spatial database is that the leisure activity data 310 is segmented based on physical position. The particular segmentation shown in the figure is based on a horizontal index 340 and vertical index 350. Thus each cell has a horizontal coordinate and a vertical coordinate. For example, the upper-left cell might have coordinates (0, 0). The three leisure activities shown within the cell are segmented into the same cell though each leisure activity is associated with a different physical position. One skilled in the art will appreciate that this segmentation could be based on any many-to-one mapping of physical positions to cells. Thus the spatial database need not necessary have a grid structure of cells, but could more generally encompass a graph structure of cells.

Regardless of the specific segmentation method, one purpose of segmentation is to spatially proximate but efficient retrievals. For example, in a grid-like spatial database, such as the one shown in FIG. 3, the cells near a particular cell of interest can be easily retrieved by adding or subtracting 1 from the coordinates of the cell of interest. This operation can be completed without exploring the leisure activities associated with more distant cells.

Spatial Databases of Different Abstract Activity Types

Figure 4A:
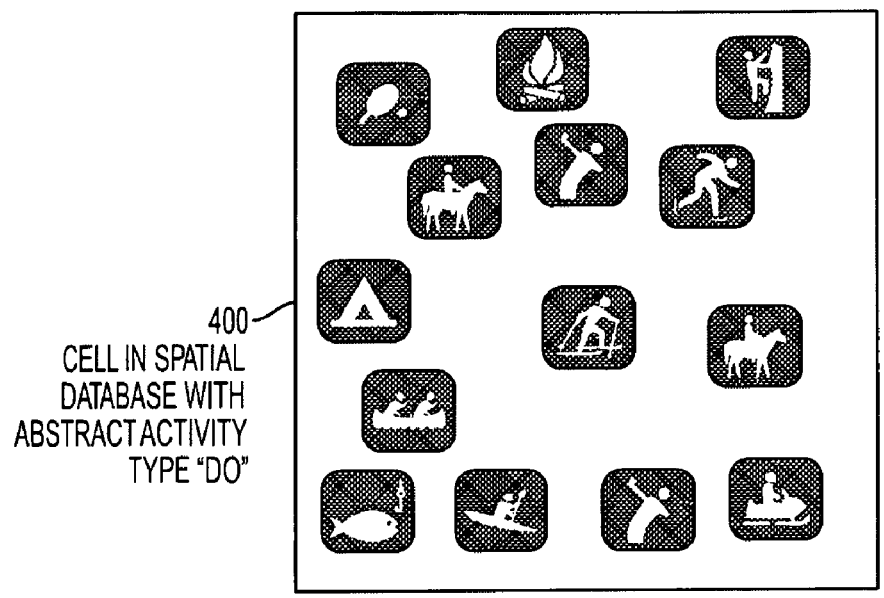
FIGS. 4A and 4B present exemplary cells from spatial databases of different abstract activity types in accordance with an embodiment of the present invention.
Figure 4B:
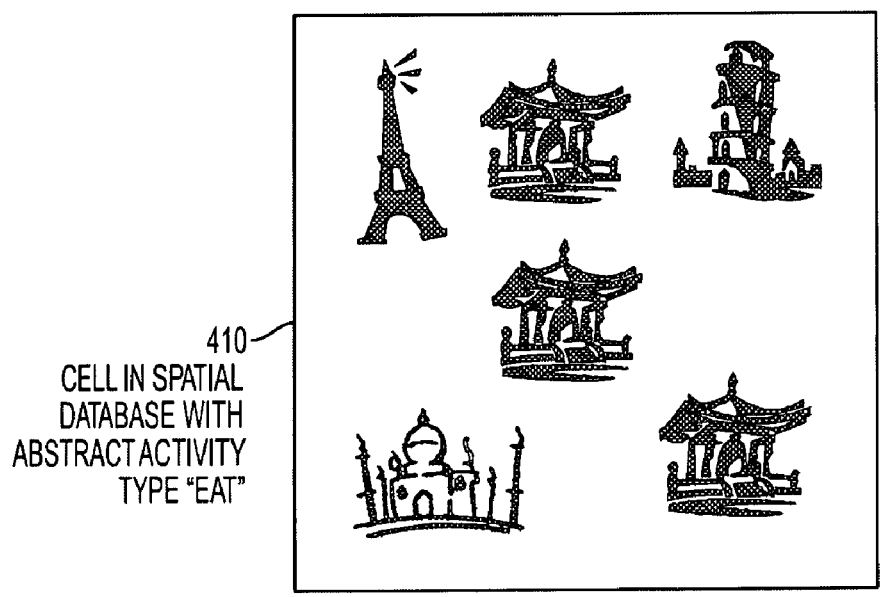

FIGS. 4A and 4B present exemplary cells from spatial databases of different abstract activity types in accordance with an embodiment of the present invention. For example, FIG. 4A presents an exemplary cell 400 from a spatial database of abstract activity type "DO." All cells in this type of spatial database are of abstract activity type "DO". For example, cell 400 shows activities such as tennis, camping, horseback riding, golf, skiing, speed skating, climbing, canoeing, fishing, kayaking, and snowmobiling. Note that the cells in a spatial database of abstract activity type "DO" don't include abstract activities of other types such as "EAT" or "SEE." One skilled in the art will appreciate that abstract activity types can be specified at any level of abstraction. For example, an abstract activity type might be specified as "EAT ETHNIC" instead of just "EAT."

FIG. 4B presents an exemplary cell 410 from a spatial database of abstract activity type "EAT." All cells in this type of spatial database are of abstract activity type "EAT". For example, cell 410 shows eating activities at different ethnic restaurants (represented here by familiar icons associated with each ethnicity): one French restaurant (the Eiffel tower), on Italian restaurant (the Leaning Tower of Pisa), one Indian restaurant (the Taj Mahal), and three Chinese restaurants (Chinese temple). Note that the cells in a spatial database of abstract activity type "EAT" don't include abstract activities of other types such as "DO" or "SEE."

A spatial database comprising multiple spatial databases, each with separate abstract activity types, enables more efficient retrieval. For example, if the user specifies an activity type "Italian restaurant," only the spatial database associated with abstract activity type "EAT" need be searched. This is because "Italian restaurant" is associated with the abstract activity type "EAT."

Once potential nearby matches of "EAT" are found, a later computation can then select those activity types that match "Italian restaurant." One skilled in the art will appreciate that this later computation can be accomplished on any computer system. For example, this later computation can be accomplished on the user's computing device. One skilled in the art will also appreciate that a single spatial database can also be used to store heterogeneous abstract activity types.

Nearness Metric

Figure 5A:
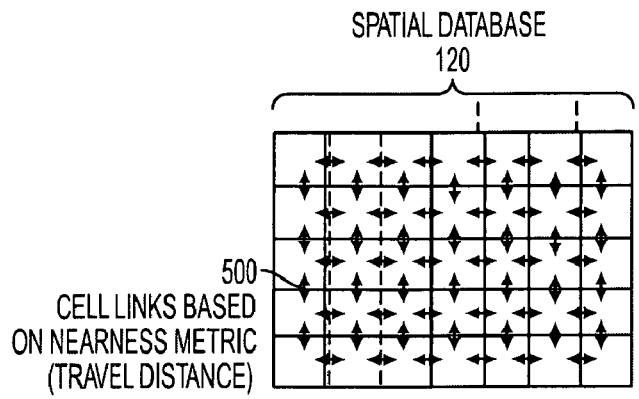
FIGS. 5A, 5B, and 5C present an exemplary spatial database in which cells are linked based on the nearness metric of travel distance, travel time, and travel cost, respectively, in accordance with an embodiment of the present invention.

FIG. 5A presents an exemplary spatial database 120 in which cells are linked based on a nearness metric of travel distance in accordance with an embodiment of the present invention. For clarity of presentation, leisure activity data is not shown. The cell links 500, which are represented here as arrows, define the neighborhood around a cell. For example, in this linkage structure each cell has four other direct neighbors, representing the following moves along the links emanating from the cell: up, down, left, right. The cell links can be viewed as having a "cost" of 1 unit in terms of travel distance. The nearness metric in this arrangement of links is the well-known "Manhattan distance" metric, also known as rectilinear distance. One skilled in the art will appreciate that those cells requiring diagonal moves from the cell (i.e., (up, left), (up, right), (down, left), and (down, right)) might be part of a different link arrangement, which results in a different nearness metric. Diagonal links might have a cost of one unit or the square root of two units, depending on the application. Similarly, a cell in a hexagonal grid of cells might have six neighbors, each equidistant and unit cost from the central cell. In short, many different grid tilings and link arrangements are possible.

Figure 5B:
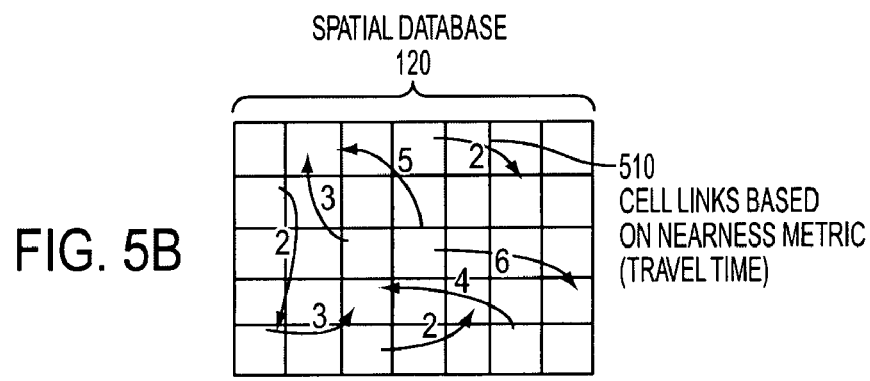

FIG. 5B presents an exemplary spatial database 120 in which cells are linked based on the nearness metric of travel time in accordance with an embodiment of the present invention. For clarity of presentation, leisure activity data is not shown. As in the previous figure, the cell links 510, are represented as arrows and define the neighborhood around a cell. However, in this example, the links have non-unit cost such as 2, 3, 4, 5, 6, 4, and 3. These costs might represent travel time in terms of minutes. For example, the left-most link (with a "2") might represent a subway that can rapidly take the user from one point to another. In contrast, the travel distance metric in FIG. 5A might not reflect the fast transit capabilities of the subway. In this example, incorporating both travel distance and travel time might allow the user to choose whether or not to include mass transit in deciding what leisure activities are to be returned.

Figure 5C:
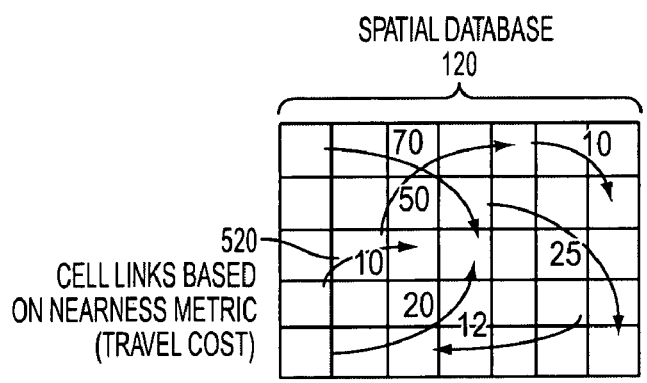
Figure 6:
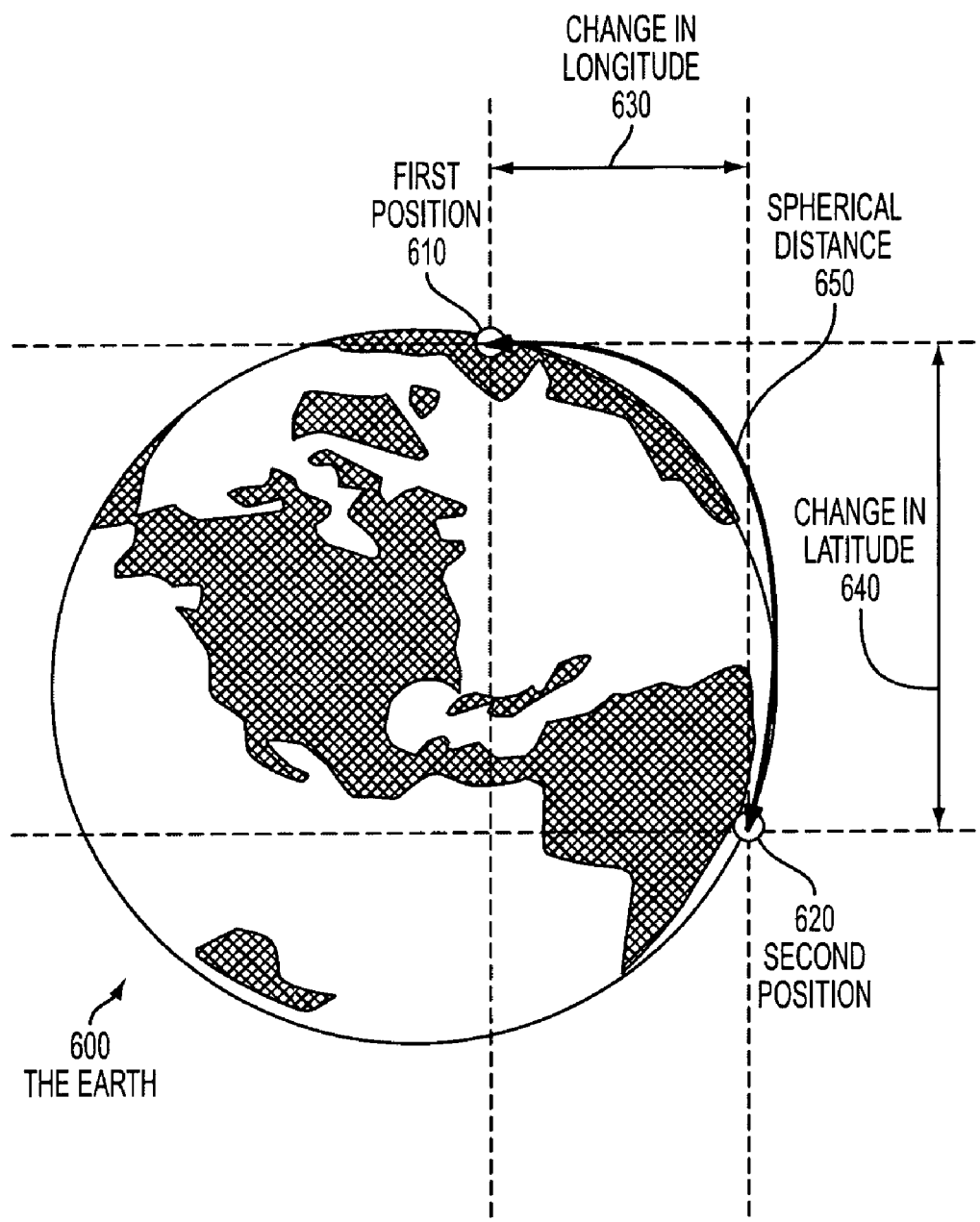
FIG. 6 presents an exemplary relationship between spherical distance and the latitude and longitude of two positions on earth in accordance with an embodiment of the present invention.

FIG. 5C presents an exemplary spatial database 120 in which cells are linked based on the nearness metric of travel cost in accordance with an embodiment of the present invention. For clarity of presentation, leisure activity data is not shown. As in the previous figure, the cell links 520, are represented as arrows and define the neighborhood around a cell. However, in this example, the links might represent travel cost in terms of dollars. Additionally incorporating travel cost as a metric lets the use choose whether or not to include travel cost in deciding what leisure activities might be retrieved.

One skilled in the art will appreciate that the nearness metric can incorporate real-time travel data such as traffic conditions, time of day, special events, and probabilistic information such as a distribution of travel times, distances, or costs that are dependent on random events. The benefit of incorporating such additional data is that the user can make more informed decisions and can better manage the risk associated with random events.

Finding Nearby Cells

One embodiment of the present invention involves retrieving the set of leisure activities from the spatial database that are near the cell in the spatial database by transitively searching through the linked cells according to the nearness metric. One way that this transitive searching can be accomplished is through best first search. Best first search involves searching from a given cell to the closest set of neighbor cells and to their closest neighbors . . . and so forth, for all cells within the bound. Best first search typically sorts the paths to a cell by the sum of the nearness metric along the path to the cell plus a heuristic estimate of that metric. One skilled in the art will appreciate that any other search method could be used to find nearby cells. Some search methods might trade off optimality for speed by sometimes returning cells that are beyond the bound. Other search methods might be faster, but might skip certain cells within the bound. One skilled in the art will also appreciate that real-time search methods can also be used. For example, the user might desire returned results within 2 elapsed seconds and is willing to forego a more thorough but longer search that might turn up additional results.

Determining Cell Size

In accordance with an embodiment of the present invention, FIG. 5 presents an exemplary relationship between the spherical distance 650 and the latitude and longitude of the first position 610 and the second position 620 on the earth 600. Based on the relationship between the change in latitude 640 and the change in longitude 630, the spherical distance 650 can be determined using several trigonometric techniques. An embodiment of the present invention uses a linear relationship between the change in latitude and longitude and the spherical distance. The benefit of this linear approach is that it enables fast calculations. In turn, the relationship between the change in latitude and longitude can be used to determine a cell size. This embodiment also allows the present invention to include the earth's curvature in its proximity and indexing methods.

One skilled in the art will appreciate that many other techniques can be used to determine cell size, including: using activity type density, using the desired number of leisure activity matches, or using a predetermined cell size. The spatial database could incorporate multiple cell sizes simultaneously and use only those that are appropriate for the user's intent.

Figure 7:
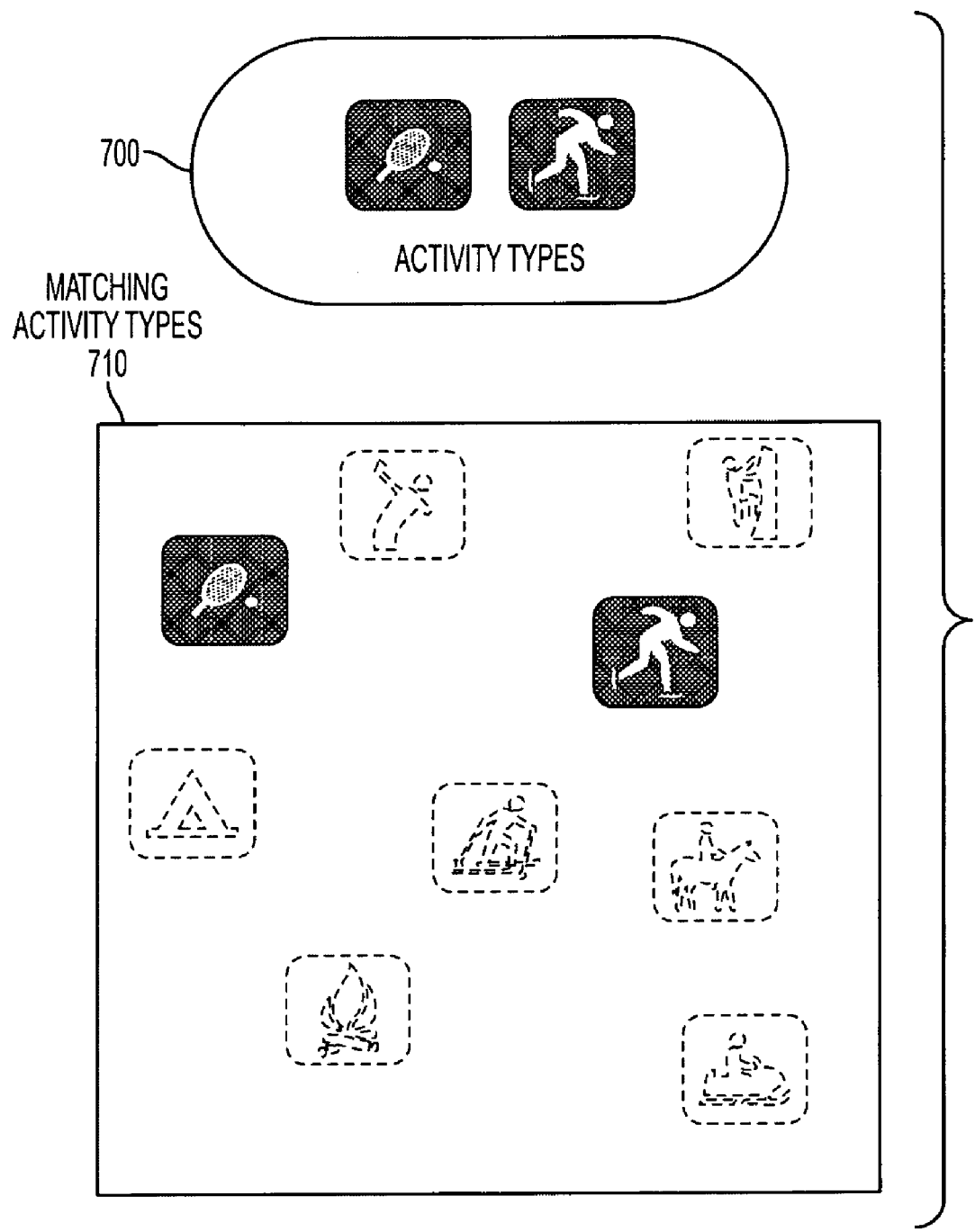
FIG. 7 presents an exemplary cell with leisure activities that match the activity types in accordance with an embodiment of the present invention.

FIG. 7 presents an exemplary cell with leisure activities that match the activity types in accordance with an embodiment of the present invention. The figure illustrates these activity types as simple icons. In this situation the activity types 600 include speed skating, and tennis. Since both of these activities are of abstract type "DO," only the "DO" spatial database is searched. For convenience, item 710 shows those activities that match the activity types. Activities such as golf, skiing, climbing, camping, snowmobiling, horseback riding, and campfires are excluded because they do not match the activity types. Note this matching process can be associated with a later computation, possibly on the user's computing device. One skilled in the art will appreciate that activity types can also represent a query in a database query language of arbitrary complexity.

Figure 8:
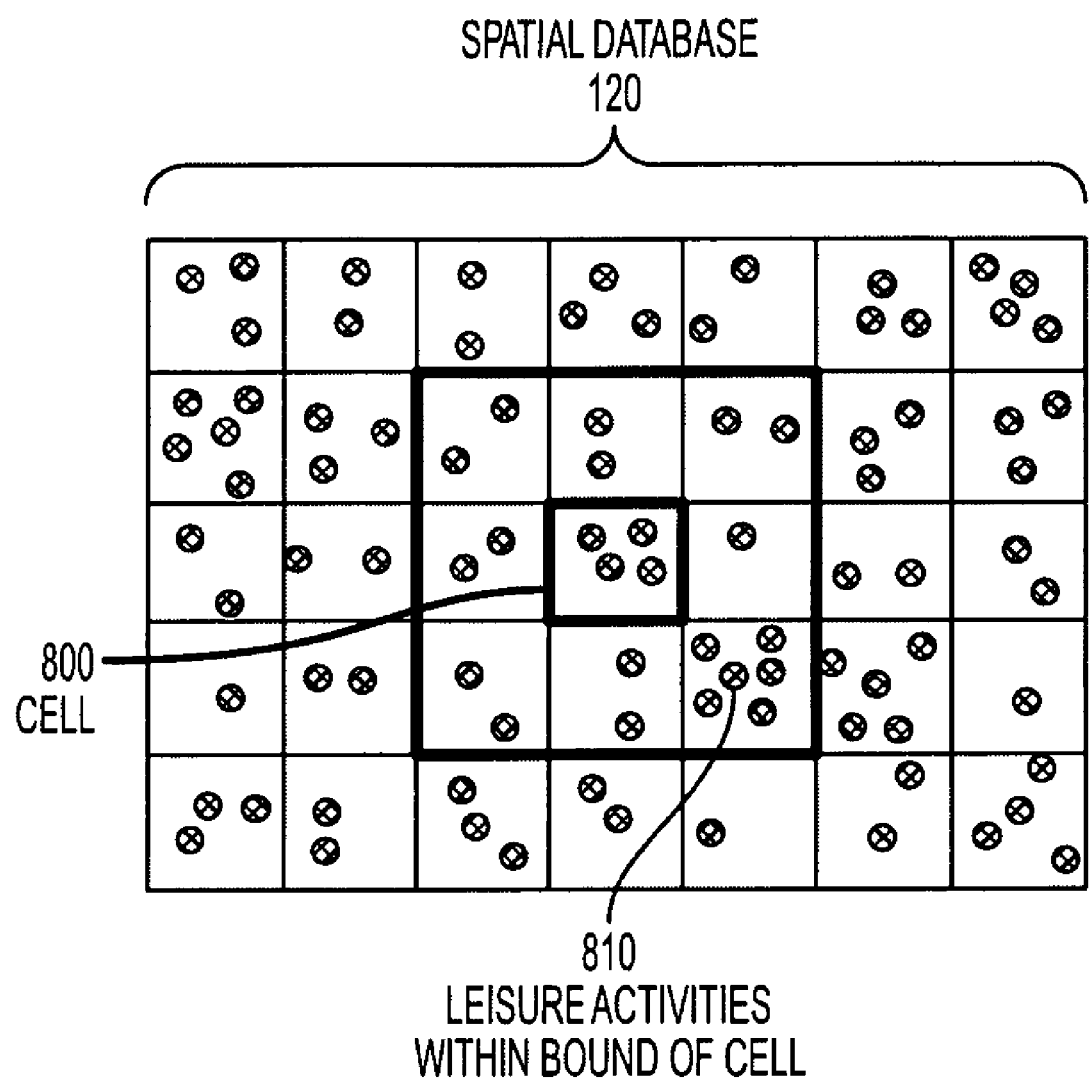
FIG. 8 presents an exemplary set of leisure activities that are within a bound of a cell in accordance with an embodiment of the present invention.

FIG. 8 presents an exemplary set of leisure activities that are within a bound of a cell in accordance with an embodiment of the present invention. Cell 800 might represent the current user location. The leisure activities (810) that are within the bound of the cell are enclosed by the larger outer square. In this situation the bound might be one horizontal, vertical, and diagonal step away from cell 800. One skilled in the art will appreciate that the bound can be an arbitrary shape around cell 800. For example, one side of cell 900 might be surrounded by a river; it might be desirable to have a bound that includes more area on the non-river side.

Figure 9:
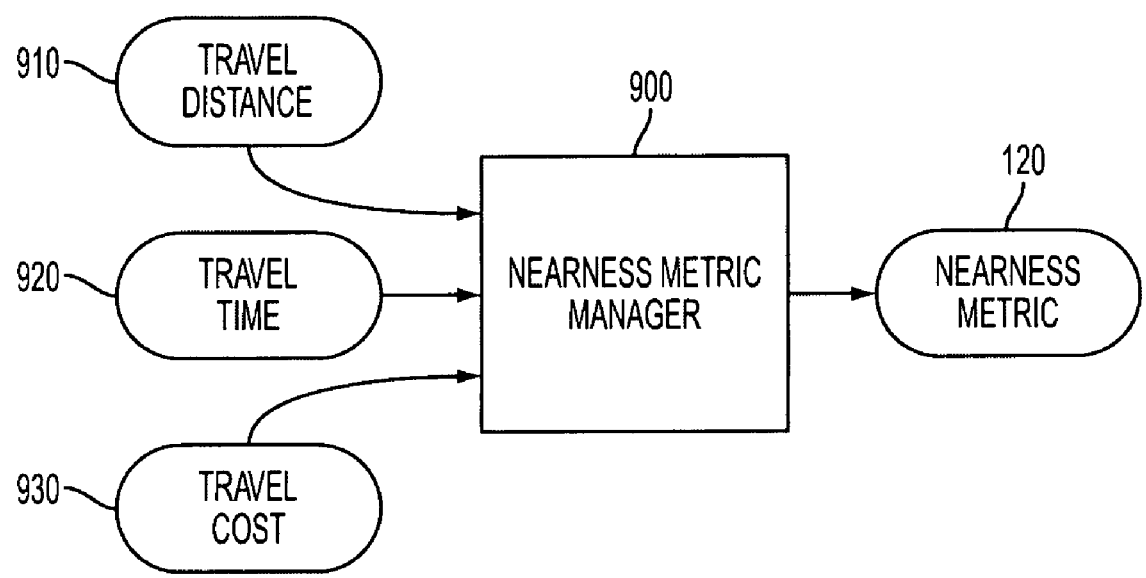
FIG. 9 presents an exemplary nearness metric manager in accordance with an embodiment of the present invention.

FIG. 9 presents an exemplary nearness metric manager in accordance with an embodiment of the present invention. Nearness manager 900 integrates metrics such as travel distance 910, travel time 920, and travel cost 930 according to the user's specification. The product of the integration is nearness metric 120. One skilled in the art will appreciate that the nearness metric manager could incorporate any metric of interest.

Figure 10:
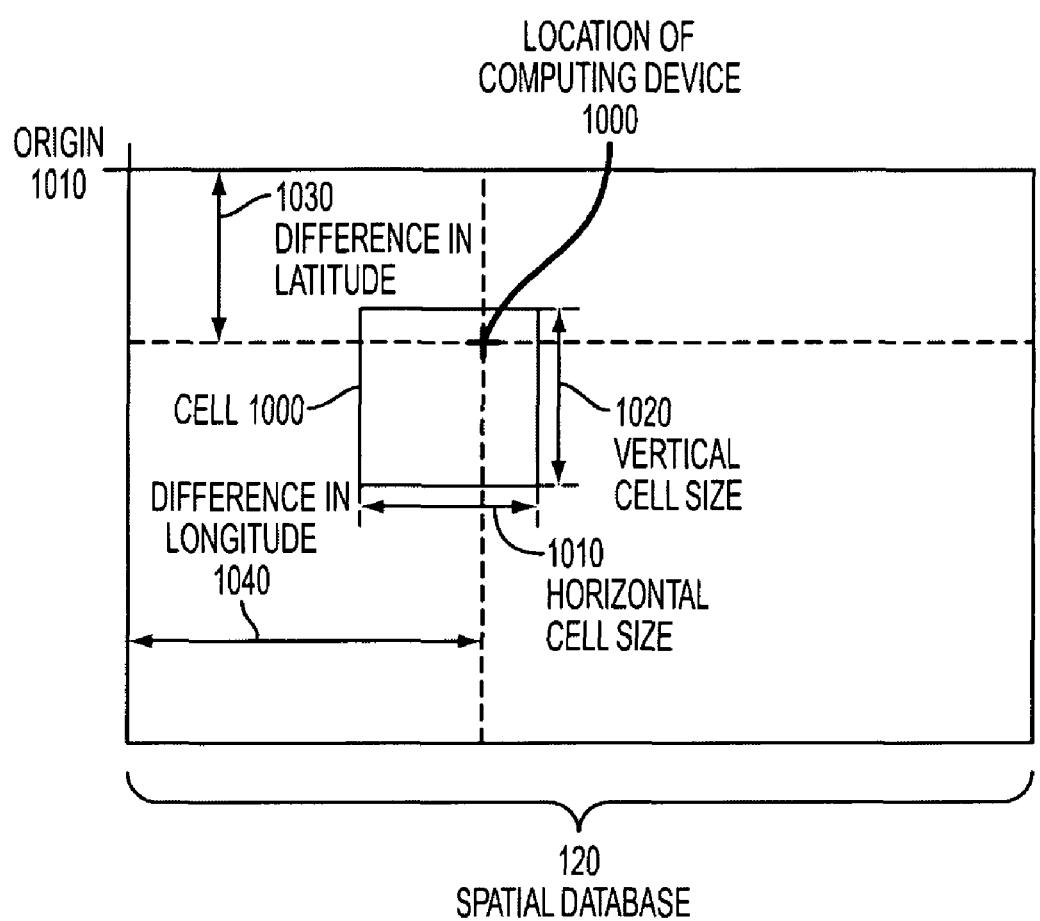
FIG. 10 presents an exemplary cell identified from the location of a computing device in accordance with an embodiment of the present invention.

FIG. 10 presents an exemplary cell identified from the location of a computing device in accordance with an embodiment of the present invention. The spatial database 120 in this case contains a grid of cells. The difference in latitude 1030 is the difference between the latitude of the origin 1010 and the latitude of the location of the computing device 1000. The difference in longitude 1040 is the difference between the longitude of the original 1010 and the longitude of the location of the computing device 1000. To identify the cell, one embodiment of the present invention divides the difference in latitude 1030 by the vertical cell size 1020 to yield the vertical index of cell 1010 and the difference in longitude 1040 by the horizontal cell size to yield the vertical index of cell 1010. These differences are relative to a predefined origin 1010. One skilled in the art will appreciate that several other operations such as truncation or rounding may be necessary to obtain discrete indices of the cell. Moreover, one skilled in the art will appreciate that the method for determining spherical distance as disclosed in this paper can be used to determine vertical and horizontal cell size. In this embodiment, the origin (with known and fixed latitude and longitude) acts as the first point and the location of the computing device as the second point (with variable latitude and longitude). Finally, one skilled in the art will appreciate that different positioning systems yield different methods of computing the indices.

Figure 11:
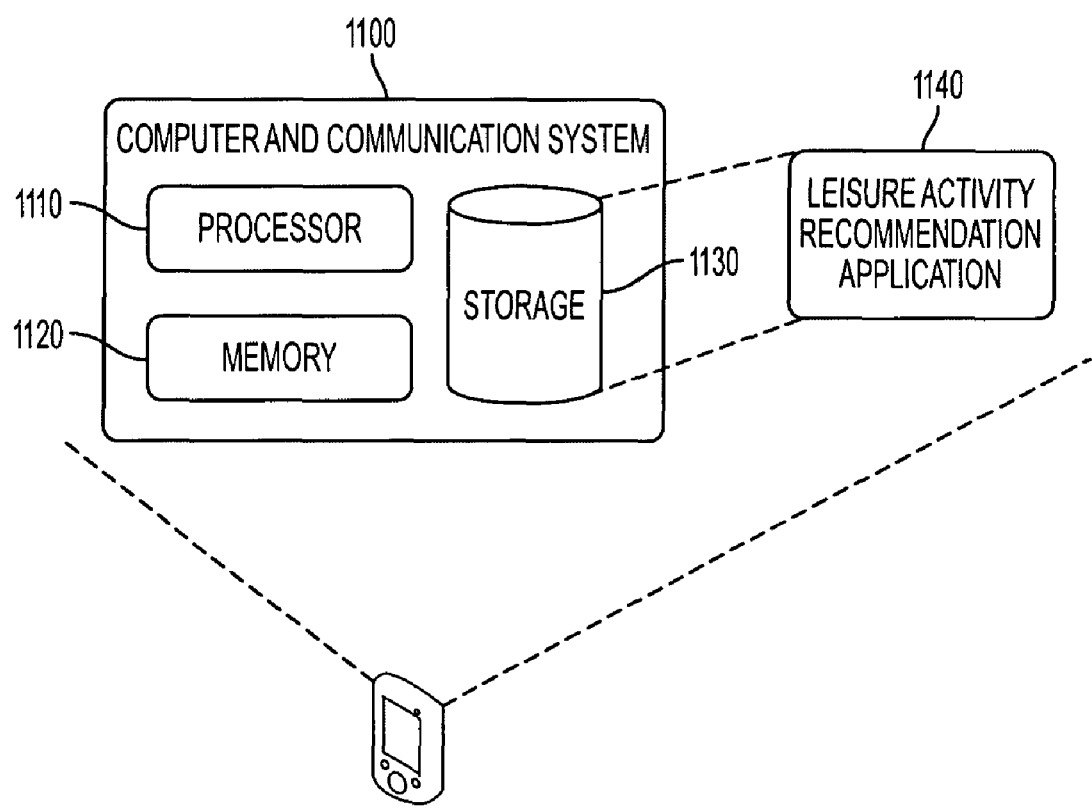
FIG. 11 presents an exemplary computer system for a leisure-activity recommendation system in accordance with an embodiment of the present invention.

FIG. 11 presents an exemplary computer system for a leisure-activity recommendation system in accordance with an embodiment of the present invention. The leisure activity recommendation application 1140 interacts with the computer and communication system 1100 through storage 1130, processor 1110, and memory 1120.

Returning the Set of Leisure Activities

After retrieving from the spatial database a set of leisure activities that matches the activity types and that are within the bound relative to the cell, the results are returned to the user. One skilled in the art can envision the many different methods of presenting these: ranked according to the metric, ranked by degree of matches, ranked by risk involved in reaching the leisure activity, or ranked according to some method specified by the user (e.g. list restaurants first).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for providing recommendations of leisure activities to a user, wherein the computer comprises a processor, the method comprising:
   receiving an activity type and a nearness metric;
   identifying a cell stored in a spatial database based on location information associated with a computing device of the user, wherein the spatial database stores leisure activities corresponding to geographically segmented cells;
   wherein the spatial database stores a number of cells, and the number of cells in the spatial database depends on the density of leisure activities in a given geographic area and the type of leisure activity;
   determining a set of nearby cells based on the identified cell and a bound corresponding to the nearness metric;
   retrieving leisure activities that match the activity type and are associated with the nearby cells; and
   returning the set-of-retrieved leisure activities to the user.

2. The method of claim 1, wherein the nearness metric is based on one or more of: travel distance, travel time, and travel cost.

3. The method of claim 1, wherein the location information involves a set of coordinates associated with the computing device of the user.

4. The method of claim 1, wherein identifying the cell stored in the spatial database based on the location information further comprises:
   computing the difference in latitude from the location of the computing device to an origin specified in the spatial database;

computing the difference in longitude from the location of the computing device to the origin specified in the spatial database;

dividing the change in latitude by horizontal cell size to yield the horizontal index of the cell;

dividing the change in longitude by vertical cell size to yield the vertical index of the cell; and returning the horizontal and vertical indices of the cell.

5. The method of claim 1, wherein retrieving leisure activities that match the activity type and are associated with the nearby cells, further comprises:

locating a set of cells in the spatial database that are within a fixed neighborhood of the cell based on the cell links; and returning the set of leisure activities associated with each of the cells in said set of cells.

6. The method of claim 1, wherein retrieving leisure activities that match the activity type and are associated with the nearby cells involves transitively searching through the linked cells according to the nearness metric.

7. A computer-readable storage medium storing instructions that when executed by a computer cause the computer to perform a method for providing recommendations of leisure activities to a user, the method comprising:

receiving an activity type and a nearness metric;

identifying a cell stored in a spatial database based on location information associated with a computing device of the user, wherein the spatial database stores leisure activities corresponding to geographically segmented cells;

wherein the spatial database stores a number of cells, and the number of cells in the spatial database depends on the density of leisure activities in a given geographic area and the type of leisure activity;

determining a set of nearby cells based on the identified cell and a bound corresponding to the nearness metric;

retrieving leisure activities that match the activity type and are associated with the nearby cells; and returning the set-of-retrieved leisure activities to the user.

8. The computer-readable storage medium of claim 7, wherein the nearness metric is based on one or more of: travel distance, travel time, and travel cost.

9. The computer-readable storage medium of claim 7, wherein the location information involves a set of coordinates associated with the computing device of the user.

10. The computer-readable storage medium of claim 7, wherein identifying the cell stored in the spatial database based on the location information further comprises:

computing the difference in latitude from the location of the computing device to an origin specified in the spatial database;

computing the difference in longitude from the location of the computing device to the origin specified in the spatial database;

dividing the change in latitude by horizontal cell size to yield the horizontal index of the cell;

dividing the change in longitude by vertical cell size to yield the vertical index of the cell; and returning the horizontal and vertical indices of the cell.

11. The computer-readable storage medium of claim 7, wherein retrieving leisure activities that match the activity type and are associated with the nearby cells, further comprises:

locating a set of cells in the spatial database that are within a fixed neighborhood of the cell based on the cell links; and returning the set of leisure activities associated with each of the cells in said set of cells.

12. The computer-readable storage medium of claim 7, wherein retrieving leisure activities that match the activity type and are associated with the nearby cells involves transitively searching through the linked cells according to the nearness metric.

13. A system for providing recommendations of leisure activities to a user, comprising:

a processor;

a memory;

a receiving mechanism configured to receive an activity type and a nearness metric;

an identification mechanism configured to identify a cell stored in a spatial database based on location information associated with a computing device of the user, wherein the spatial database stores leisure activities corresponding to geographically segmented cells;

wherein the spatial database stores a number of cells, and the number of cells in the spatial database depends on the density of leisure activities in a given geographic area and the type of leisure activity;

a determination mechanism configured to determine a set of nearby cells based on the identified cell and a bound corresponding to the nearness metric;

a retrieval mechanism configured to retrieve leisure activities that match the activity type and are associated with the nearby cells; and an output mechanism configured to return the retrieved leisure activities.

14. The system of claim 13, wherein the nearness metric is based on one or more of: travel distance, travel time, and travel cost.

15. The system of claim 13, wherein the identification mechanism is configured to receive a set of coordinates associated with the computing device of the user.

16. The system of claim 13, wherein the identification mechanism is farther configured to:

compute the difference in latitude from the location of the computing device to an origin specified in the spatial database;

compute the difference in longitude from the location of the computing device to the origin specified in the spatial database;

divide the change in latitude by horizontal cell size to yield the horizontal index of the cell;

divide the change in longitude by vertical cell size to yield the vertical index of the cell; and returning the horizontal and vertical indices of the cell.

17. The system of claim 13, wherein the retrieval mechanism is farther configured to:

locate a set of cells in the spatial database that are within a fixed neighborhood of the cell based on the cell links; and return the set of leisure activities associated with each of the cells in said set of cells.

* * * * *